Dec. 12, 1933. F. A. THAHELD 1,939,242

COUPLING

Filed Feb. 15, 1932

Inventor
Feri A. Thaheld

By Jack A. Ashley
Attorney

Patented Dec. 12, 1933

1,939,242

UNITED STATES PATENT OFFICE 1,939,242

COUPLING

Feri A. Thaheld, Dallas, Tex., assignor, by mesne assignments, to Guiberson Diesel Engine Company, Dover, Del., a corporation of Delaware Application February 15, 1932. Serial No. 592,860

10 Claims. (Cl. 29—148.2)

This invention relates to new and useful improvements in couplings.

In such couplings as are used for fuel lines for internal combustion engines and the like, there is considerable breakage due to vibration, particularly in the type in which a ferrule is fastened on the end of a tube. Fuel line tubes are usually made of copper, brass or some other bendable material and it is therefore necessary to fasten a metal ferrule on the end of the tube so that it may be secured in a union or other coupling. It is common practice to solder the ferrule on the tube, and vibration soon breaks the connection.

It is also necessary, particularly in high compression fuel lines, to use ground joints in the couplings in order to prevent leaks.

One object of the invention is to provide means for securing a ferrule on the end of a tube so that vibration will not break the ferrule loose from the tube.

A further object of the invention is to provide a method of securing a ferrule on the end of a tube, whereby an amplified connecting medium may be used, thus assuring a more permanent fastening.

Another object of the invention is to provide means for fastening a ferrule on a tube in such a manner as to lend itself to the forming of a ground joint.

A construction designed to carry out the invention will be hereinafter described together with other features of the invention.

Figure 1:
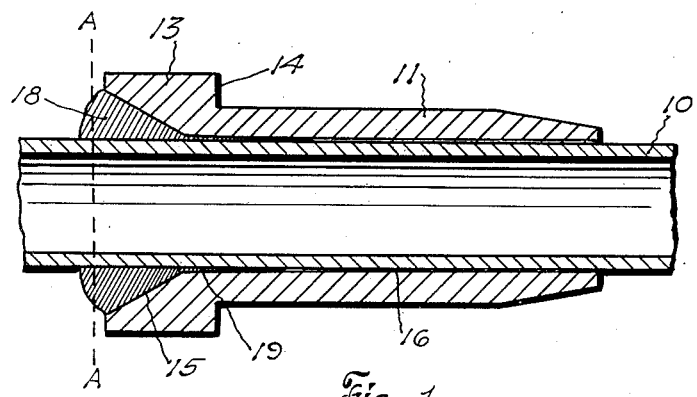
Figure 2:
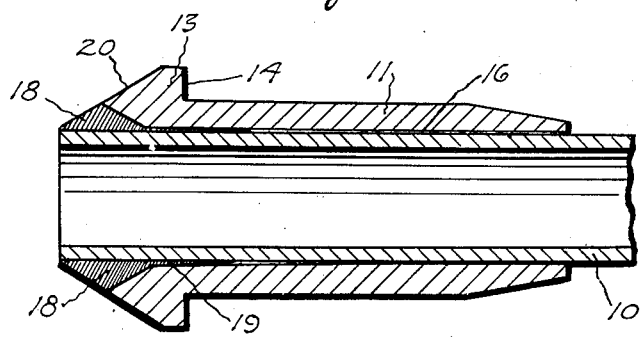
Figure 3:
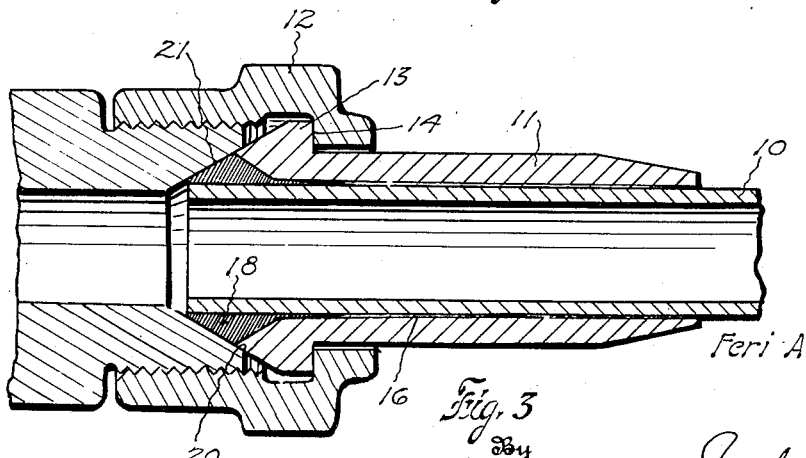

The invention will be more readily understood from a reading of the following specification and by reference to the accompanying drawing in which an example of the invention is shown, and wherein:

Figure 1 is a longitudinal sectional view showing a ferrule fastened on a tube and ready to be finished, Figure 2 is a similar view showing the ferrule and tube after finishing, and Figure 3 is a longitudinal sectional view showing the ferrule and tube secured in a union.

In the drawing the numeral 10 designates a length of tube such as is used for fuel lines for internal combustion engines and the like. This tubing is usually made of brass, copper or some other metal which may be readily bent so that it may be fitted in various places. It is customary to secure a ferrule 11 on the tube and insert the ferrule in a coupling 12. Owing to the thinness of the walls of the tubing and the softness of its metal, it is not practical to screw-thread the tubing and ferrule, and therefore they have generally been fastened together by means of solder. As a rule the solder has been applied at one end of the ferrule and this soon breaks loose and causes a leak.

In carrying out the invention, the ferrule 11 is formed with a cylindrical head 13 and an annular shoulder 14. An inclined annular socket 15 is counter-bored in the head, and the ferrule is given a bore 16 whose diameter is slightly greater than the diameter of the tube 10.

The ferrule 11 is placed on the tube 10 as shown in Figure 1 and brass or some other brazing material 18 is fused and flowed into the socket 15 around the tube. A film 19 of the brass will find its way into the bore 17 and thus an amplified contact with the surface of the tubing will be had. The socket 15 is of such size as to receive an appreciable quantity of the brazing metal.

When the parts have cooled the tube 10 and brass 18 are cut off along the line A—A as shown in Figure 1. The head 13 and the brass filler are then ground off to provide a frusto-conical nipple 20. This nipple has its surface formed partly of the brazing metal or ferrule 18, and partly of the metal of which the ferrule 11 is formed. The ferrule 11 and the union 12 may be formed of any hard metal suitable for the purpose. By this manner of mounting the ferrule on the tubing a tight joint is provided and a finished surface is readily produced on the nipple. The nipple is fitted into the complementary seat 21 of the coupling and may be ground therein so that when the union is tightened a joint is provided which will not leak. By this arrangement vibration is absorbed and breakage is reduced to a minimum.

Various changes in the size and shape of the different parts as well as modifications and alterations, may be made within the scope of the appended claims.

Having illustrated and described a preferred form of the invention, what I claim, is:

1. The method of uniting a soft metal tube and a hard metal coupling ferrule which consists in brazing the ferrule on the tube, then cutting off the tube, and then grinding off the ferrule and the brazed metal to form a composite frusto-conical nipple.

2. The method of uniting a soft metal tube and a hard metal coupling ferrule which consists in forming the ferrule with a socket, mounting the ferrule on a tube having a diameter less than the bore of the ferrule, flowing brazing metal into the socket and bore of the ferrule around the tube, and then finishing off the ferrule to form a composite frusto-conical nipple.

3. The combination of a soft metal tube and a hard metal ferrule, the ferrule being brazed to the tube, the head of the ferrule and the brazing metal being ground to form a composite nipple.

4. The combination with a union having an inclined seat, of a ferrule having a composite, inclined nipple fitting in said seat and formed of hard metal and a brazed metal, both metals contacting said seat over a substantial portion of the surfaces of each metal.

5. The combination with a soft metal tube and a hard metal ferrule, said ferrule having a socket surrounding the tube, and brazing material flowed into the socket and united to the tube, the end of said ferrule and the brazing material within said socket both being shaped to form a composite frusto-conical nipple; of a union having an inclined seat fitting against said nipple, and contacting with both the brazing material and the metal of said ferrule over a substantial portion of the inclined surfaces of both.

6. The combination as set forth in claim 5 in which the ferrule is composed of metal relatively hard as compared with the metal of which the tube is composed, and the frusto-conical surface of the nipple is uniformly ground to insure a fluid-tight fit with the inclined seat of the union.

7. The combination as set forth in claim 5 in which the internal diameter of the ferrule is greater than the external diameter of the tube and the brazing material extends beyond the socket for a substantial distance along the tube.

8. The combination as set forth in claim 5 in which the internal diameter of the ferrule is greater than the external diameter of the tube, and the brazing material extends beyond the socket along the tube for a portion only of the length of the ferrule, leaving an unfilled space surrounding the tube, whereby a strong connection between the ferrule and tube is insured, while permitting some vibration of the tube.

9. In combination with a tube composed of relatively soft metal, a ferrule composed of relatively hard metal fitting over said tube adjacent one end thereof, said ferrule having an internal diameter slightly greater than the external diameter of the tube and having an internal counter-bored socket at one end, and brazing material filling said socket and extending around the tube for at least a portion of the length of the ferrule, whereby a strong connection between the ferrule and tube is insured.

10. The combination as set forth in claim 9 wherein the end of the ferrule and of the brazing material constitute a composite nipple having an abraded frusto-conical surface, adapted to engage a correspondingly inclined seat of a metal union.

FERI A. THAHELD.